United States Patent
Henderleiter, Sr.

(10) Patent No.: US 7,963,728 B2
(45) Date of Patent: Jun. 21, 2011

(54) METHOD AND APPARATUS FOR POWDER DELIVERY SYSTEM

(75) Inventor: Timothy James Henderleiter, Sr., Kansas City, MO (US)

(73) Assignee: Valspar Sourcing, Inc., Minneapolis, MN (US)

( * ) Notice: Subject to any disclaimer, the term of this patent is extended or adjusted under 35 U.S.C. 154(b) by 98 days.

(21) Appl. No.: 11/526,979

(22) Filed: Sep. 26, 2006

(65) Prior Publication Data

US 2007/0169843 A1 Jul. 26, 2007

Related U.S. Application Data

(60) Provisional application No. 60/757,115, filed on Jan. 6, 2006.

(51) Int. Cl.
 *B65G 53/24* (2006.01)
(52) U.S. Cl. ........................................ 406/141; 406/114
(58) Field of Classification Search .................. 406/113, 406/114, 134, 141; 414/403; 222/180, 464.7
 See application file for complete search history.

(56) References Cited

U.S. PATENT DOCUMENTS

| | | | |
|---|---|---|---|
| 4,113,146 A | 9/1978 | Williamson | |
| 4,480,766 A | 11/1984 | Platt | |
| 4,505,623 A | 3/1985 | Mulder | |
| 4,597,102 A | 6/1986 | Nattrass | |
| 4,913,321 A | 4/1990 | Abboud | |
| 4,966,311 A * | 10/1990 | Taylor | 222/105 |
| 5,140,935 A | 8/1992 | Gruber | |
| 5,271,695 A * | 12/1993 | Bischof et al. | 406/114 |
| 5,382,117 A * | 1/1995 | Rings et al. | 406/39 |
| 5,507,602 A | 4/1996 | Walker | |
| 5,518,344 A * | 5/1996 | Miller et al. | 406/39 |
| 5,667,352 A * | 9/1997 | Curtin et al. | 414/667 |
| 5,690,450 A | 11/1997 | Miller et al. | |
| 5,938,338 A | 8/1999 | McDonough | |
| 5,944,070 A * | 8/1999 | Schmidt et al. | 222/105 |
| 5,944,455 A * | 8/1999 | Wilhelm | 406/141 |
| 5,975,351 A * | 11/1999 | DeLacerda | 222/1 |
| 5,993,062 A | 11/1999 | Shackleton | |
| 6,036,408 A * | 3/2000 | Wilhelm et al. | 406/113 |
| 6,186,360 B1 | 2/2001 | Becker et al. | |
| 6,398,462 B1 * | 6/2002 | Fulkerson | 406/134 |
| 6,499,584 B1 | 12/2002 | Keim et al. | |

(Continued)

FOREIGN PATENT DOCUMENTS

DE 195 06 538 A1 8/1996

(Continued)

OTHER PUBLICATIONS

"Material Lifts" Catalog, *Genie* United States, 15 pages (Mar. 2005).

*Primary Examiner* — Gene Crawford
*Assistant Examiner* — William R Harp
(74) *Attorney, Agent, or Firm* — Mueting Raasch & Gebhardt, P.A.

(57) ABSTRACT

A flexible bag (10) has an open top configured and arranged for receiving one or more feed tubes (32). The bag (10) preferably includes at least one attachment member (20) adapted and configured to be secured to a support member (47). A fixture (50), (60), (70), (80) is utilized to receive the bag (10).

14 Claims, 8 Drawing Sheets

U.S. PATENT DOCUMENTS

| | | | |
|---|---|---|---|
| 6,533,121 B1 | 3/2003 | Ross | |
| 6,923,340 B2 | 8/2005 | Ambs | |
| 6,945,470 B2 * | 9/2005 | Kia et al. | 239/106 |
| 6,979,166 B2 * | 12/2005 | Ours et al. | 414/403 |
| 2004/0074922 A1 | 4/2004 | Bothor et al. | |
| 2004/0169050 A1 | 9/2004 | Ambs | |
| 2004/0190799 A1 | 9/2004 | Hess et al. | |
| 2005/0194405 A1 | 9/2005 | Kosich | |

FOREIGN PATENT DOCUMENTS

| | | |
|---|---|---|
| DE | 197 41 108 A1 | 3/1999 |
| EP | 0 962 258 A1 | 12/1999 |
| EP | 1 580 133 A2 | 9/2005 |
| GB | 2 150 538 A | 7/1985 |
| JP | 50-30286 A | 3/1975 |
| JP | 6-24557 | 2/1994 |

* cited by examiner

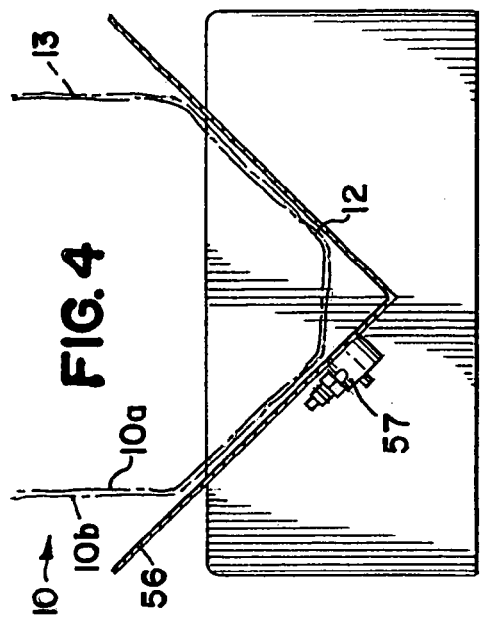
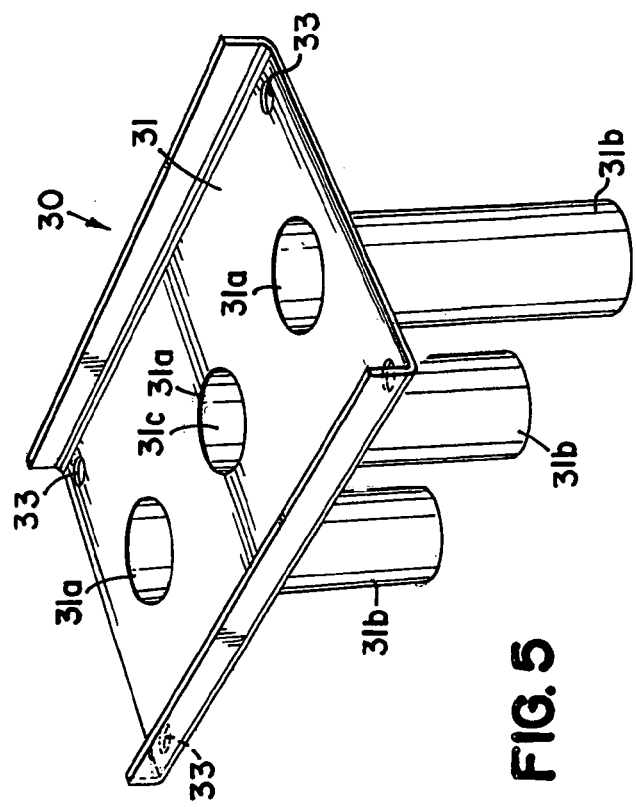

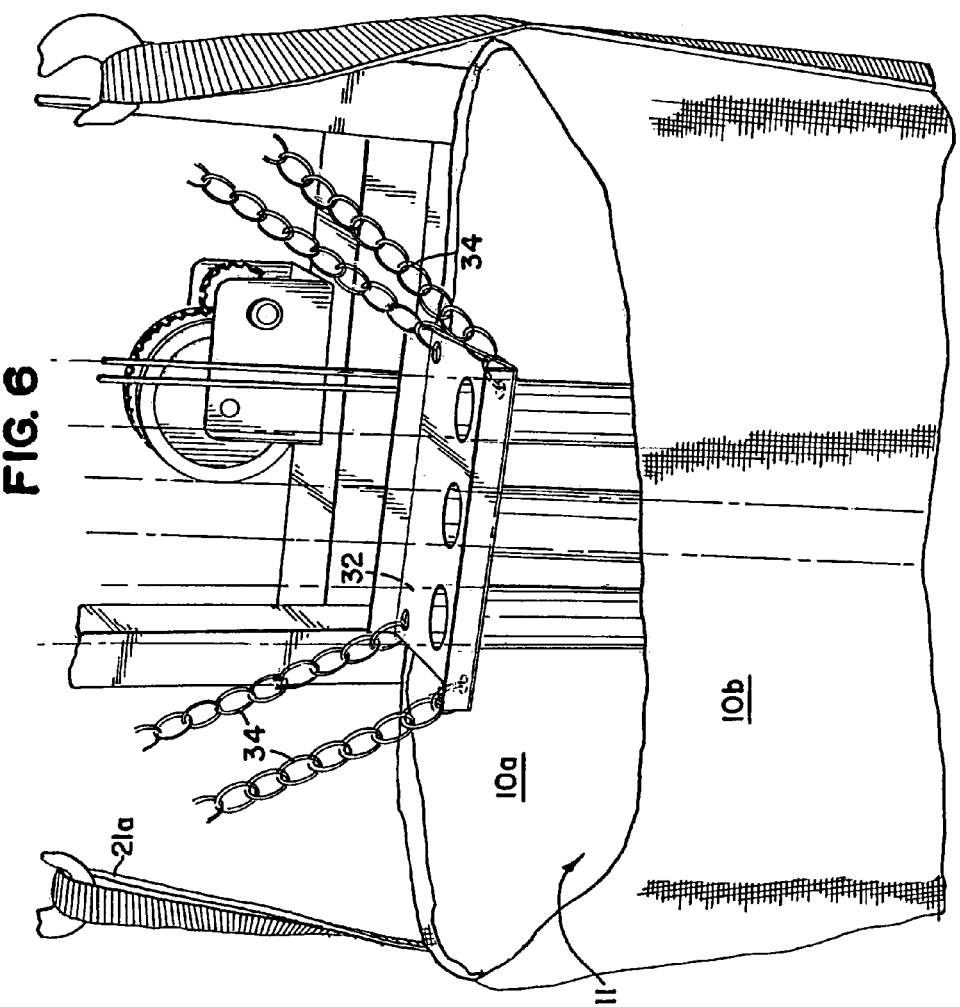

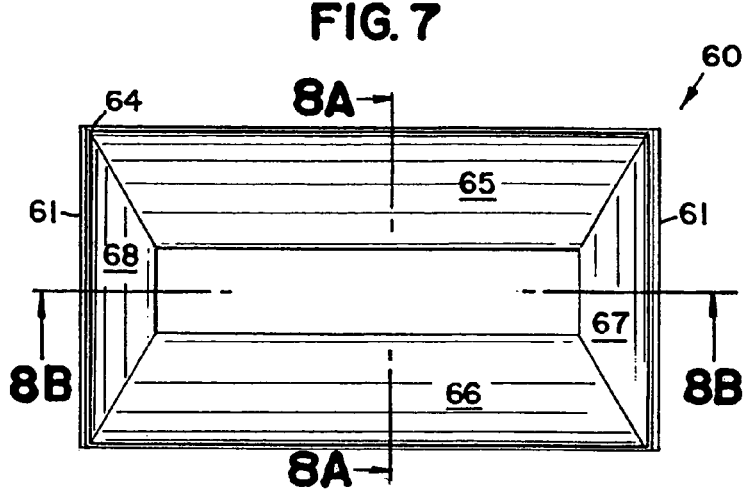
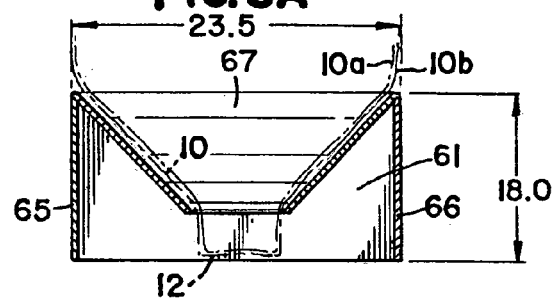
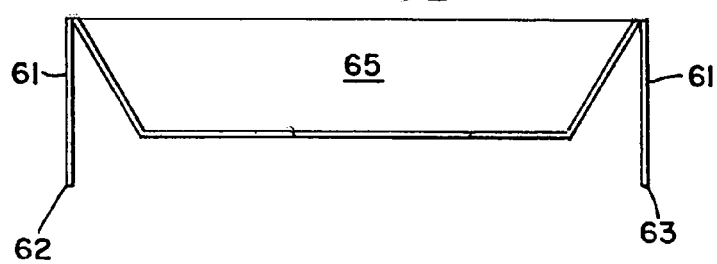
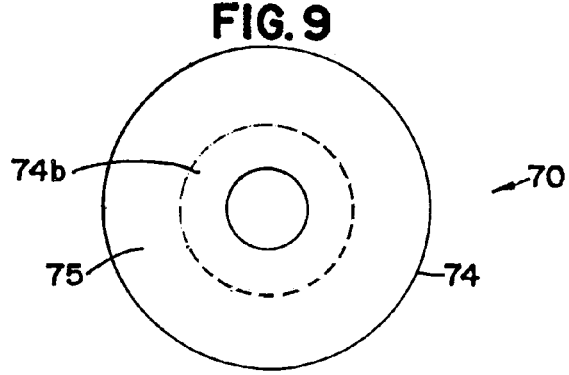

METHOD AND APPARATUS FOR POWDER DELIVERY SYSTEM

This application claims the benefit of U.S. Provisional Application No. 60/757,115, filed Jan. 6, 2006.

BACKGROUND OF THE INVENTION

1. Field of the Invention

This invention is directed toward a method and apparatus for the delivery of powder through a feed line utilizing a flexible bag.

2. Description of the Prior Art

Powder paint is utilized in electrostatic finishing. The powder is normally received in drum containers such as a 30-gallon drum. Such drums are rigid, quite heavy and will typically weigh between 200-300 pounds each when filled. The powder in the drum must be transferred to a hopper for a spray booth. This is typically done by aspirating the powder that is in the drum to the hopper in the spray booth. Such an apparatus is shown in U.S. Pat. No. 4,505,623.

The drums typically arrive on a pallet. Then, it is necessary that the drums are typically rotated off the pallet, wherein the drums drop 3-4 inches to the floor. The drums are then moved to a suitable apparatus for transferring the powder, such as that shown in U.S. Pat. No. 4,505,623. Such a method and apparatus is difficult to utilize ergonomically. In addition, the hard sided drums then provide for a problem for waste disposal. The present invention addresses the problems associated with the prior art method and apparatus.

SUMMARY OF THE INVENTION

In one embodiment the invention is an apparatus having at least one feed tube. A flexible bag has a top configured for receiving the at least one feed tube. A support apparatus has at least one support member capable of maintaining the flexible bag in a vertical position. A fixture has a receiving member over which the bag is positioned, wherein the receiving member, when the apparatus is being used to deliver finely divided particulate, positions as least the lower portion of the bag and wherein the apparatus facilitates powder delivery by aspiration through the at least one feed tube.

In another embodiment the invention is a fixture having a housing. The housing has an inlet sized and configured to receive at least a lower portion of a flexible bag containing a dense powder and a side that forms a shape that, when in its operating position, has a decreasing cross-section when measured along a vertical axis towards the ground. When the bag, containing a finely divided particulate, is set in the housing, a lower portion of the bag generally conforms to the shape formed by the side. When the bag is set in the housing and a feed tube is inserted through the top of the bag to aspirate the finely divided particulate, the feed tube is directed towards the lowermost portion of the bag by the side. A base is operatively connected to the housing, the base supporting the housing off of a floor surface.

In another embodiment, the invention is a method that includes providing a flexible bag containing a finely divided particulate. The bag is positioned adjacent a fixture sized and configured to receive at least a lower portion of the flexible bag and having a side that forms a shape when in its operating position having a smaller, decreasing cross-section when measured along a vertical axis towards the ground. An aspiration feed tube is positioned into the bag and the finely divided particulate is aspirated through the tube, wherein as the finely divided particulate level is decreased, the tube is permitted to move to a lower position in the bag and is directed towards the lowermost portion of the bag by the side.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The above summary of the present invention is not intended to describe each disclosed embodiment or every implementation of the present invention. The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 4 is a cross-sectional view of the fixture shown in FIG. 3, taken generally along the lines 4-4;

FIG. 5 is a perspective view of a guide;

FIG. 6 is a perspective view of the guide in position in the opening of the flexible bag;

FIG. 7 is another embodiment of a fixture for use with the present invention;

FIG. 8a is a cross-sectional view of the fixture shown in FIG. 7 taken generally along the lines 8a-8a;

FIG. 8b is a cross-sectional view of the fixture shown in FIG. 7 taken generally along the lines 8b-8b;

FIG. 9 is a top plan view of another embodiment of the fixture;

DETAILED DESCRIPTION OF A PREFERRED EMBODIMENT

Figure 1:
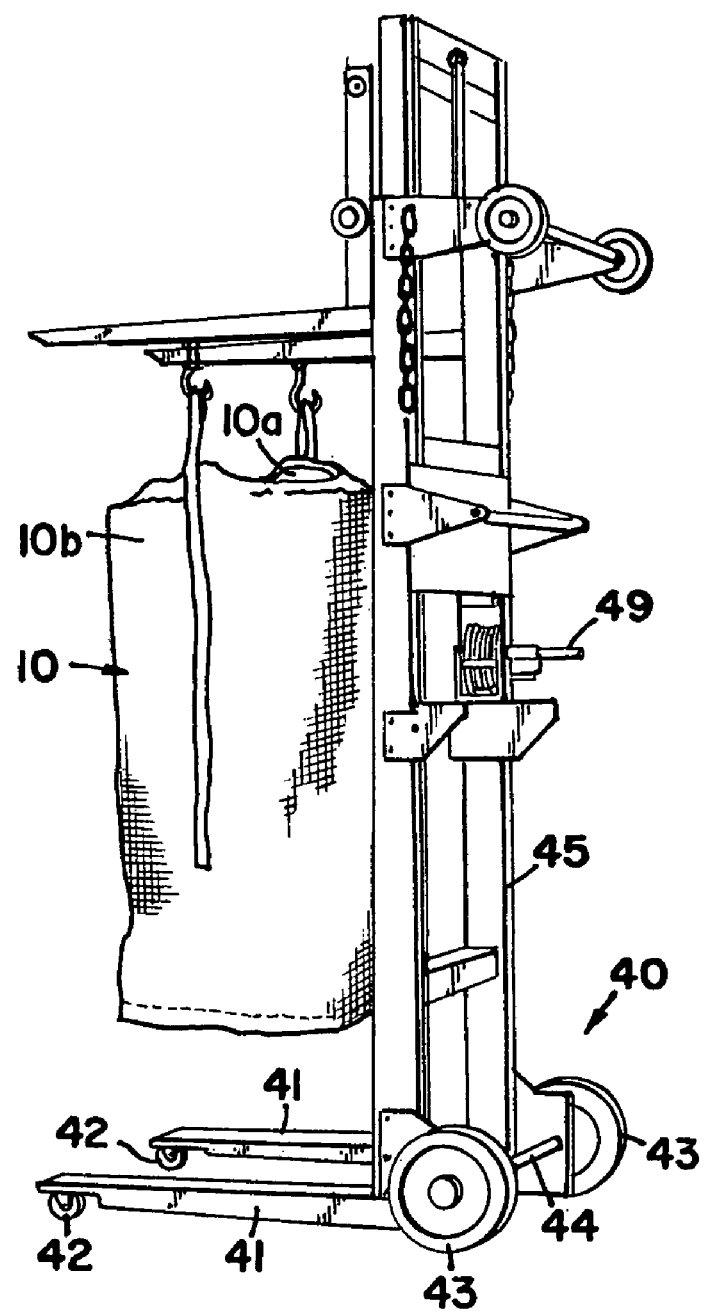
FIG. 1 is a perspective view of a lift and flexible bag, viewed generally from the side.

Referring to the drawings, where like numerals represent like parts throughout the several views, there is generally disclosed at 10 a flexible bag. The bag 10 is preferably a two-art bag, comprising an inner layer 10a and is made from a suitable plastic, such as polyethylene. An outer layer 10b is made from a suitable material such as what is referred to as a fabric bag construction material, such as a woven polyethylene or woven polypropylene. The inner bag 10a is preferably closed with a tie wrap, as is the outer bag 10b. The bag 10 has an opening 11 through which a dense powder product, such as powder paint, is dispensed. The bag may be any suitable size, such as a size equivalent to a 30- or 55-gallon (113-208 liter) drum. The weight of a bag 10 filled with a suitable dense powder, would typically weigh between 200-300 pounds (91-136 kg). The bags may then be placed on a pallet and shrink wrap applied to maintain multiple bags on one pallet. The outer bag 10b may have a suitable construction such as a base 12 (FIG. 4) that is circular and is stitched or sewn to a side panel 13 to form the bag 10b. Other suitable construction or combination may be utilized to result in the flexible bag 10. An optional attachment member 20 is operatively connected to the bag 10. One example of an attachment member 20 is shown as a length of webbing 21 that is operatively connected by suitable means, such as stitching, to the outer layer 10b of bag 10. The webbing extends above the top of the bag 10 and forms a loop. One way of constructing a loop 21a is to utilize a length of webbing and secure both ends to the bag 10, thus leaving a loop 21a that may be utilized in the handling of the bag 10. It is of course understood that other suitable attachment members 20 may also be utilized. Some examples of which are the use of Velcro® fasteners, grommets, tubes or sleeves.

As seen in FIG. 5, a tube guide 30 is shown. The tube guide 30 has a generally planar top 31 in which three openings 31a are formed. Three cylindrical members 31b are suitably attached proximate the openings 31a and extend generally downward from the planar top 31, although it is understood that they could also extend upward. Further, it is recognized tubes are optional as just the openings 31a provide some guidance for feed tubes 32. The cylindrical members 31b have bores 31c that are sized to receive feed tubes 32. The feed tubes 32 are connected to a suitable apparatus, well known in the art, that provides for aspiration of the powder paint contained in the bag 10. The planar top 31 has four attachment openings 33 that are utilized to position the tube guide over the opening 11. A chain 34 has hooks 35 at each of the chains ends and the hooks 35 are fitted in the attachment openings 33. The chains 34 are looped over a device, to be described more fully hereafter, to support the tube guide 30 in position. It is understood other suitable methods may be used to support the tube guide 30.

Figure 2:
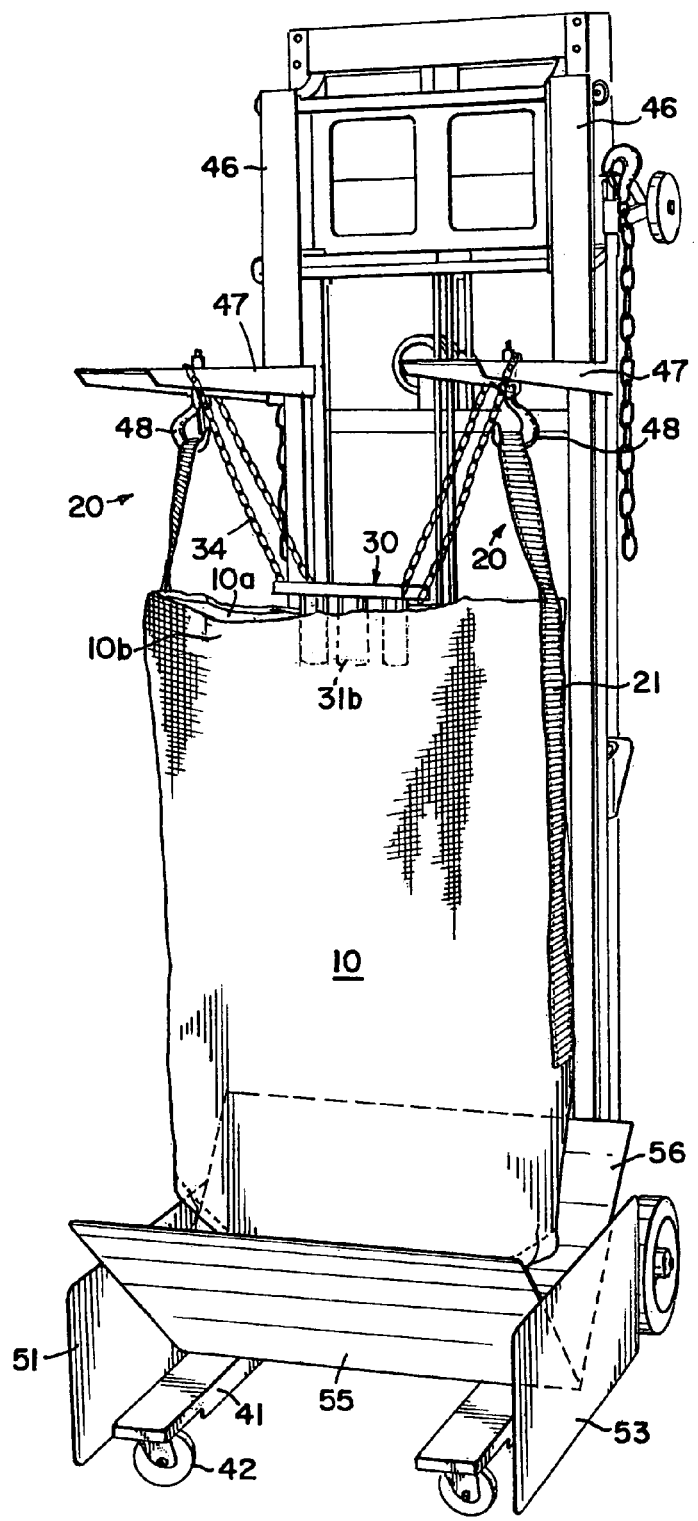
FIG. 2 is a perspective view, viewed generally from in front, of the flexible bag in position on a fixture.

A material lift 40 is shown in FIGS. 1 and 2. The material lift 40 may be any suitable lift such as a Genie® lift supplied by Genie® Industries, United States, Redmond, Wash. The material lift 40 includes a base having two extensions 41 on which are mounted, at their front ends, wheels 42. Rear wheels 43 are mounted on a suitable axle 44. On the upright frame 45 is mounted a moveable assembly 46. Support arms 47 extending generally horizontal from the moveable assembly 46. On each support arm 47 is secured a hook 48. The moveable assembly 46 is moved up and down by a hand crank 49 which utilizes suitable gears and pulleys, as is well-known in the art. While a manually moveable material lift in both the horizontal and vertical orientations is shown, it is understood that mechanized versions, as well as other suitable material lifts may also be utilized.

Figure 3:
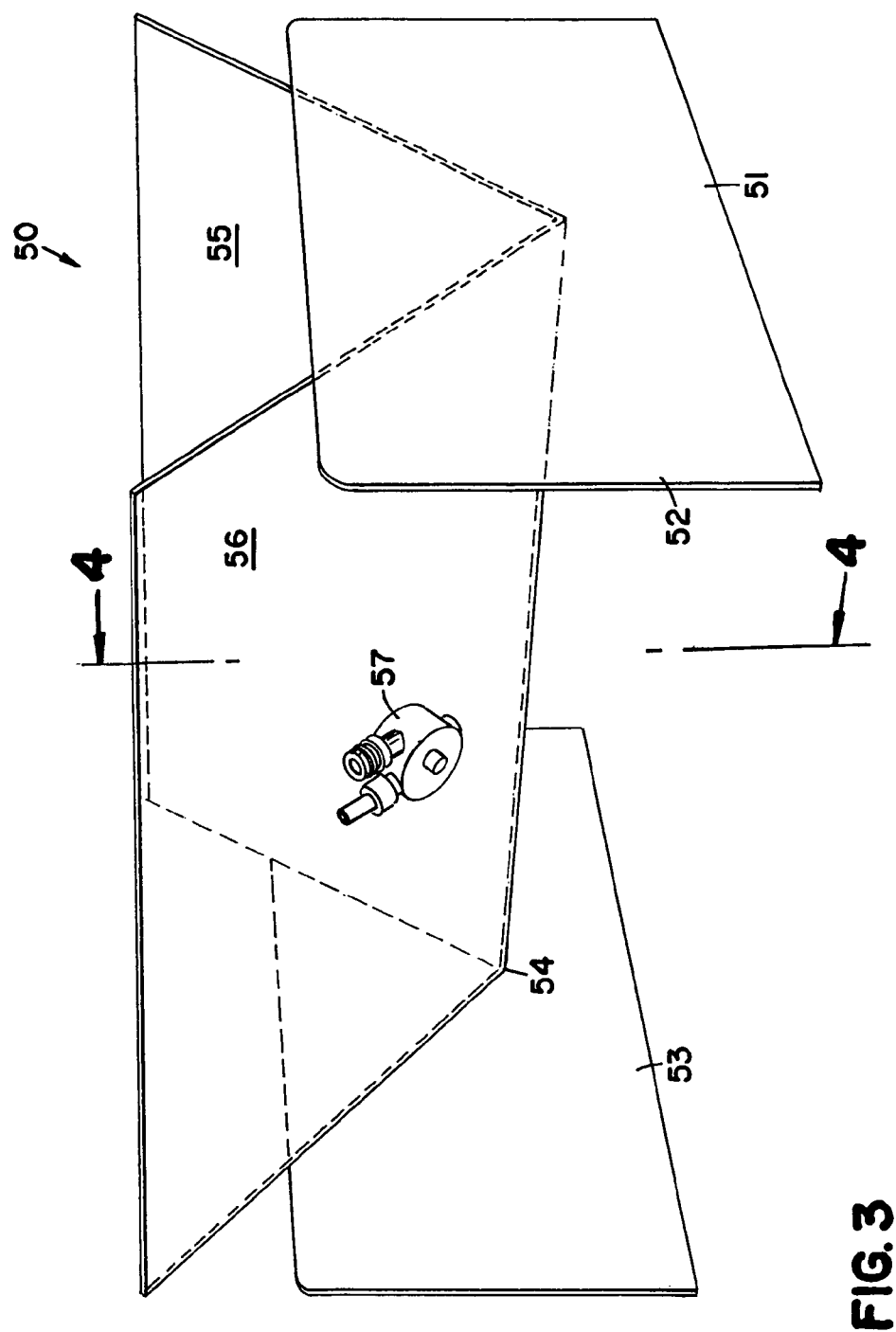
FIG. 3 is a more detailed view of the fixture shown in FIG. 2.

A first embodiment of a fixture 50 is shown in FIGS. 2, 3 and 4. The fixture 50 includes a base 51 that includes a first side plate 52 and a second side plate 53. A housing 54 includes a front plate 55 operatively connected to a back plate 56. The bottom portion of the ends of the plates 55 and 56 are operatively connected to the side plates 52 and 53. The housing 54 forms a V shape that is adapted and configured to receive a bag 10. As can be seen, the cross section of the housing 54 decreases when measured along a vertical axis toward the ground. An air driven vibratory motor 57 is operatively connected to the housing 54. The operation of such a motor 57 is well known in the art. The motor 57 vibrates the housing, and thereby the powder inside of the bag 10 to aid in the dispensing of the powder. FIG. 4 shows a bag 10 that has been positioned in the fixture 50. As can be seen, the lower portion of the bag deforms and generally conforms to the shape of the housing 54.

Another embodiment is a fixture 60, as shown in FIGS. 7 and 8. The fixture 60 has a base 61, that includes a first side plate 62 and a second side plate 63. A housing 64 has an open top adapted and configured to receive the bag 10. Further, the housing 64 has an open bottom through which the bag 10 may extend. Front and back plates 65 and 66 angle generally inward, as do side plates 67 and 68. The plates 65 through 68 are all operatively connected and generally form an inverted truncated pyramid. Again, the housing 54 has a smaller, decreasing cross-section when measured along a vertical axis toward the ground. As can be seen in FIG. 8a, the bag 10 will generally conform to the shape of the housing 64 and will also have a generally decreasing cross-section when measured along a vertical axis toward the ground.

Figure 10:
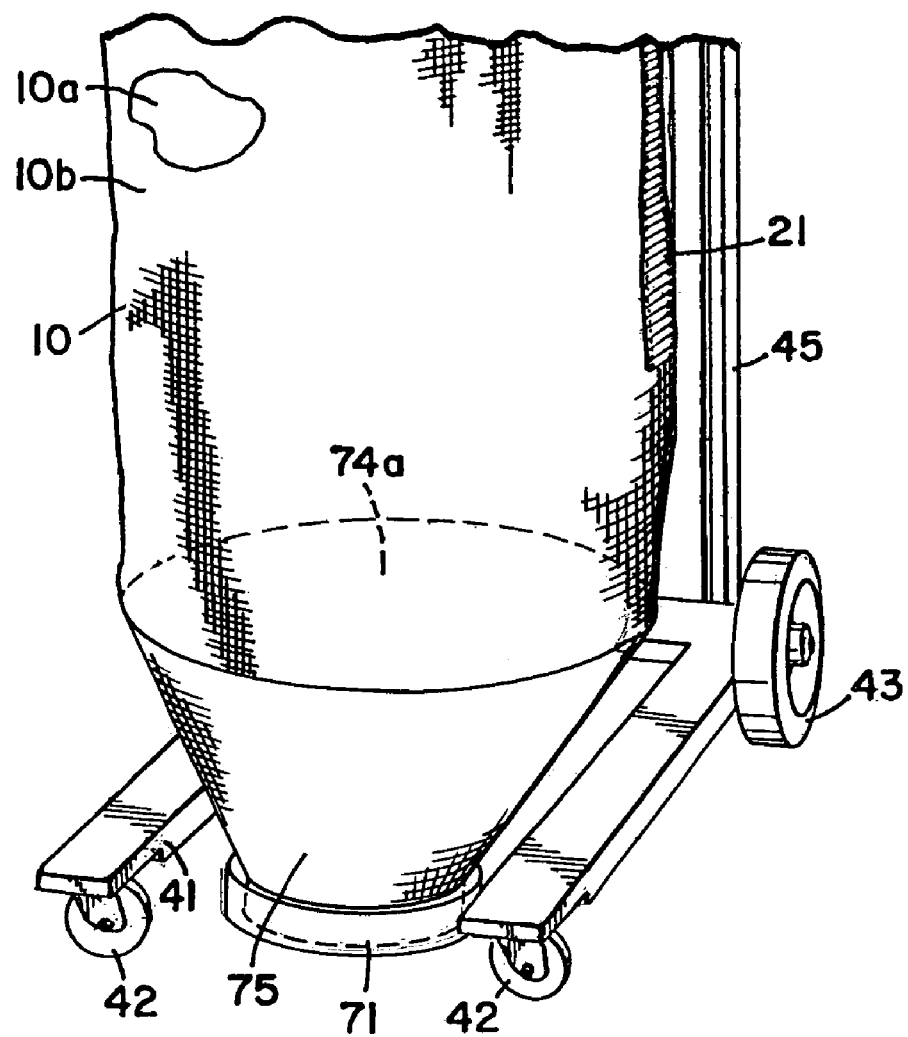
FIG. 10 is a perspective view of the fixture shown in FIG. 9, with a base.

A third embodiment shows a fixture 70 in FIGS. 9 and 10. The fixture 70 is generally conical and has a base 71. The base 71 is generally rectangular and has an opening that is sized and configured to receive the conical shape formed by the housing 74. The housing 74 includes a side plate 75 that is conical and has an opening 74a at the top that is adapted and configured to receive the bag 10 and may also optionally have an opening 74b at the bottom through which the bag 10 may extend. Again, the housing 54 has a decreasingly smaller cross-section when measured along a vertical axis toward the ground and therefore when the bag 10, is positioned in the housing 74, the bag will generally conform to the housing 74 and the bag will likewise have a decreasing cross-section when measured along a vertical axis toward the ground.

Figure 12:
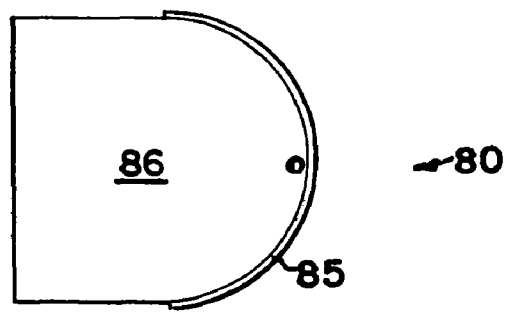
FIG. 12 is a cross-sectional view of the fixture shown in FIG. 11, taken generally along the lines 12-12.
Figure 11:
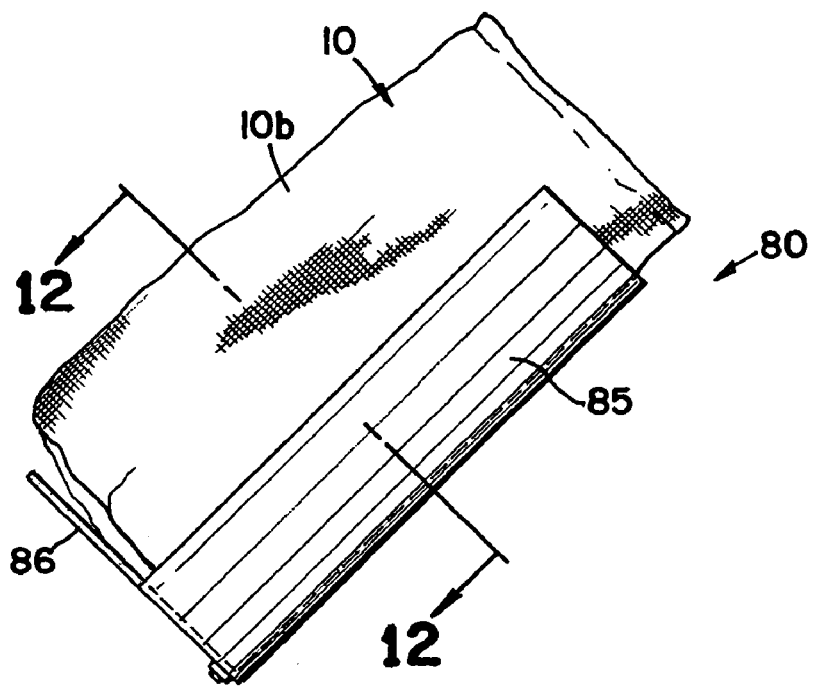
FIG. 11 is a side elevational view of another embodiment of a fixture.

Referring to FIGS. 11 and 12, another embodiment shows a fixture 80. The fixture 80 includes a semi-circular wall 85 operatively connected to a generally planar base 86. The fixture 80 may then be tilted from the horizontal at a suitable angle such as 45°. When in this operating position, and a bag 10 is positioned in the fixture 80, the fixture will have a decreasing cross-section when measured along a vertical axis toward the ground as will the bag 10 as it again generally conforms to the shape of the wall 85. A suitable mechanism may be used to tilt the fixture 80, similar to that used in U.S. Pat. No. 4,505,623, such mechanisms being known in the art. In addition, it is understood that the fixture 60, 70 and 80 may also incorporate and air-driven vibratory motor similar to motor 57.

In one operative embodiment, the material lift 40 is moved to a location where filled bags 10 are kept. Typically, the filled bags are shipped on a pallet. The inner bag 10a is filled with a powder, such as powder paint. It is understood that the powder used is not limited to only powder paint, but may be any finely divided particulate. The extensions 41 are moved underneath the pallet and the hooks 48 are positioned over the loops 21a. The loops 21a are then lifted and placed on the hooks 48. Then, the moveable assembly 46 is raised, thereby lifting the bag 10 off of a pallet or other storage member. The material lift 40 and bag 10 are then moved in position proximate feed tubes 32 that are used in the electrostatic finishing. The feed tubes 32 are connected to suitable vacuum sources that allow for the aspiration of the powder paint into a hopper of a suitable electrostatic finishing apparatus, such apparatuses being well known in the art. Prior to operation, a tube guide 30 may be supported over the opening 11 of the bag 10. As shown in FIGS. 2 and 6, the tube guide 30 may be supported by chains 34 that are connected to the support arms 47. The tube guide allows for the proper positioning of the feed tubes 32. If desired, the chains could be supported in other manners. For instance, it may be desirable to be able to position the tube guide 30 above the hooks 48 while removing the bag 10. A rod could be secured to one of the arms 47 and the rod would extend upward and then over to proximate the center line and form a hook. The chains 34 would then have to be longer, but could be supported by that hook. Then, when it is desired to add or remove a bag 10, the chains could be removed from the hook and then reconnected, thereby shortening the chains and bringing the tube guide 30 to a position above the hooks 48. For fixtures 50 and 60, the extensions 41 are moved into position inside of the base 51 and 61 to properly position the bag 10 over the fixtures 50, 60. The moveable assembly 46 is then lowered so that the bag 10 is lowered into the housing 54, 64. The bag 10 then conforms to the increasingly smaller cross-section of the housing 54, 64, but is still also supported by the support arms 47 through the hooks 48. As previously stated, other ways of supporting the bag 10 may also be utilized. By having the feed tubes 32 now in position, the powder paint is now ready to be aspirated to the hopper of the electrostatic finishing equipment or other suitable end use. As the powder paint is dispensed, the tubes 32 move downward, by gravity, to the bottom of the bag 10. The smaller decreasing cross-section allows for the dispensing of more of the powder paint, and therefore less waste. The smaller cross-section provides for a more localized area in which the feed tubes 32 enter, to thereby aspirate more of the remaining powder paint.

The operation utilizing the fixture 70 is similar except the extensions 41 are positioned on the outside of the base 71.

In using the fixture shown in FIGS. 11 and 12, the bag 10 may be similarly moved by use of the material lift 40 from the pallet area to the position proximate the feed tubes 32. However, the wall 85 provides for support for the bag 10 and it is therefore not necessary to use the material lift 40 for support during the aspiration of the powder paint. The bag 10 may be placed in the fixture 80 when the fixture is either vertical, or tilted, as shown in FIG. 11. If placed in the fixture 80 while it is vertical, the fixture is then typically tilted after the bag is in position. Alternately, the fixture could already be tilted before the bag 10 is placed in position. The tilted fixture 80 again provides for a smaller, decreasing cross-section when measured along the vertical axis towards the ground. Since the bag is flexible and generally conforms to the shape of the fixture, the bag will have a similar, decreasing cross-section when measured along the vertical axis towards the ground. The tube guide 30, if utilized, would then have to be supported on another structure, such as on the wall 85, if the material lift 40 is not used. However, it is understood that the material lift 40 could still remain in position, even though not necessary to support the bag 10.

In the embodiments that utilize fixtures 50, 60 and 70, the material lift 40 is utilized to maintain the flexible bag 10 in a vertical position during aspiration. This is optional when using the fixture 80. When using fixtures 50, 60 and 70, the fixtures support at least a lower portion of the flexible bag 10 and it is the housing of the fixtures 50, 60 and 70 that forms a shape to which a lower portion of the bag 10 conforms. The fixture 80 does not substantially change the shape of the bag 10. However, when it is in a tilted position, the bag 10 still has a decreasingly smaller cross-section when measured along a vertical axis towards the ground. The fixtures 50, 60 and 70 are supported by the ground, although it is understood that other intermediate structures may be placed between the ground and the fixtures. While the fixture 80 may be positioned in a single position and placed on the ground similar to fixtures 50, 60 and 70, typically the fixture 80 will be positioned in another device that allows the fixture 80 to be tilted from a vertical position to the position as shown in FIG. 11.

With respect to fixtures 50, 60, 70 and 80 the shape of the housing, which has a smaller cross-section as one nears the end of the bag, will guide and direct the feed tubes 32 to the smaller cross-section, thereby assisting in more fully emptying the flexible bag 10. It is understood that when the lower portion of the bag 10 generally conforms to the shape of the decreasing cross section of the fixture, it is not necessarily the lowest portion. For instance, with respect to fixtures 60 and 70, the lowest portion of the bag 10 may actually extend below the walls of fixture, as shown in FIG. 8.

In addition, if the fixture 50, 60 and 70 have a vibratory feature, it may be advantageous to provide for a stabilizing force to prevent the fixtures 50, 60 and 70 from moving out from under the center of the bag 10. One way of doing so would be to have straps across the extensions 41. As viewed in FIG. 10, one strap would be in front of the fixture 70 proximately adjacent the wheels 42 and the other would be behind the fixture 70 and still extend between the extensions 41. This would prevent movement in a direction parallel to the extensions 41. The extensions 41 prevent significant movement in the opposite direction. The straps or confinement feature will keep the vibratory base from moving and keep the base more underneath the center of the bag 10, thereby aiding in aspirating the delivery of the finely divided particulate out of the bag.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

providing a flexible bag containing powder paint comprising an open top configured to receive at least one feed tube, wherein the flexible bag comprises a lower portion opposite the open top, and further wherein at least one attachment member is connected to the flexible bag;

supporting the flexible bag from at least one support member of a moveable lifting apparatus, wherein the flexible bag is supported from the at least one support member by the at least one attachment member connected to the flexible bag;

raising the at least one support member, thereby lifting the flexible bag;

moving the lifting apparatus and flexible bag supported using the at least one support member from a storage area to proximate the at least one feed tube;

lowering the bag on top of a fixture, wherein the fixture comprises a receiving member and a base for supporting the receiving member over which the bag is positioned;

positioning at least the lower portion of the flexible bag adjacent and in contact with the receiving member of the fixture sized and configured to receive at least the lower portion of the flexible bag, wherein positioning at least the lower portion of the flexible bag comprises conforming at least the lower portion of the flexible bag to a decreasingly smaller cross-section when measured along a vertical axis towards the ground, wherein the at least one support member extends over at least a portion of the fixture in a fixed position relative to ground such that at least the lower portion of the flexible bag is in contact with the receiving member during delivery of the powder paint from the lowermost portion of the flexible bag and at least until the lowermost portion of the flexile bag is empty;

positioning the at least one feed tube into the flexible bag;

aspirating the powder paint through the at least one tube to an electrostatic finishing apparatus, wherein as the powder paint level is decreased the tube is permitted to move to a lower position in the flexible bag and is directed towards the lowermost portion of the flexible bag by the receiving member, wherein the powder paint is aspirated through the at least one tube from the lowermost portion of the flexible bag while at least the lower portion is in contact with and being conformed to the decreasingly smaller cross-section by the receiving member;

vibrating the fixture, wherein the powder paint is assisted in moving to the lowermost portion of the flexible bag while at least the lower portion is in contact with and being conformed to the decreasingly smaller cross-section by the receiving member as the powder paint is aspirated and at least until the lowermost portion of the flexile bag is empty; and providing a tube guide positioned proximate the open top of the flexible bag, the tube guide configured and arranged to guide the at least one feed tube into the flexible bag.

2. The method of claim 1, wherein the fixture comprises a receiving member that is conical in shape.

3. The method of claim 1, wherein the fixture comprises a receiving member having one or more sides generally angled downward and inward.

4. The method of claim 1, wherein the fixture comprises a generally V-shaped receiving member.

5. The method of claim 1, wherein the bag has an inner layer and an outer layer.

6. The apparatus of claim 5, wherein the inner layer is a plastic layer and the outer layer is a woven.

7. The method of claim 1, further comprising:

supporting the flexible bag during aspiration with the at least one support member; and moving the lifting apparatus and flexible bag out of contact with the receiving member and away from the feed tube after the lowermost portion of the flexile bag is empty.

8. A method comprising:

providing a flexible bag containing powder paint, wherein the flexible bag comprises an open top configured to receive at least one feed tube, wherein the flexible bag comprises a lower portion opposite the open top, and further wherein at least one attachment member is connected to the flexible bag;

providing an electrostatic finishing apparatus operatively connected to the at least one feed tube;

providing a support apparatus having at least one support member capable of raising and lowering the flexible bag, wherein the support apparatus is further capable of maintaining the flexible bag in a vertical position during delivery of the powder paint from the flexible bag;

providing a fixture comprising a receiving member and a base for supporting the receiving member over which the flexible bag may be positioned and in which at least the lower portion of the flexible bag can be received, the fixture being shaped to conform at least the lower portion of the bag to a decreasingly smaller cross section when measured along a vertical axis toward ground when the lower portion of the flexible bag is received therein;

securing the at least one attachment member to the at least one support member;

raising the flexible bag using the support apparatus and moving the flexible bag over the fixture;

lowering the flexible bag to position at least the lower portion of the flexible bag adjacent and in contact with the receiving member of the fixture such that the fixture conforms at least the lower portion of the flexible bag to the decreasingly smaller cross-section;

positioning the at least one feed tube into the flexible bag;

aspirating the powder paint from the lowermost portion of the flexible bag through the at least one tube to the electrostatic finishing apparatus while the at least one support member extends over at least a portion of the fixture in a fixed position relative to ground such that at least the lower portion of the flexible bag is in contact with and being conformed to the decreasingly smaller cross-section by the receiving member;

vibrating the fixture to assist in moving the powder paint to the lowermost portion of the flexible bag while at least the lower portion is in contact with and being conformed to the decreasingly smaller cross-section by the receiving member and at least until the lowermost portion of the flexile bag is empty; and moving the flexible bag out of contact with the receiving member and away from the feed tube after the lowermost portion of the flexile bag is empty.

9. The method of claim 8, wherein the method further comprises providing a tube guide positioned proximate the open top of the flexible bag to guide the at least one feed tube into the flexible bag.

10. The method of claim 8, wherein the support apparatus comprises a base having at least two spaced apart extensions extending from a first base end to a second base end, an upright frame comprising a lower end mounted at the first base end and an upper end, wherein a vertically movable assembly is mounted from the upper end of the upright frame, and further wherein the support apparatus comprises at least one support member extending from the movable assembly over at least a portion of the base of the support apparatus, wherein the base of the fixture is configured to be positioned on the ground, wherein raising the flexible bag and moving the flexible bag over the fixture comprises positioning the at least two spaced apart extensions relative to the base of the fixture such that the flexible bag can be moved over the fixture.

11. The method of claim 10, wherein the base of the fixture comprises two parallel base members supporting the receiving member, and wherein positioning the at least two spaced apart extensions relative to the base of the fixture comprises positioning the at least two spaced apart extensions inside the two parallel base members such that the flexible bag can be moved over the fixture.

12. The method of claim 8, wherein the fixture comprises a conical shaped receiving member.

13. The method of claim 8, wherein the fixture comprises one or more sides generally angled downward and inward forming the receiving member.

14. The method of claim 8, wherein the fixture comprises a generally V-shaped receiving member.

* * * * *